United States Patent [19]

Pond

[11] 4,274,100

[45] Jun. 16, 1981

[54] ELECTROSTATIC SCANNING INK JET SYSTEM

[75] Inventor: Stephen F. Pond, Fairport, N.Y.

[73] Assignee: Xerox Corporation, Stamford, Conn.

[21] Appl. No.: 84,010

[22] Filed: Oct. 11, 1979

Related U.S. Application Data

[63] Continuation of Ser. No. 894,799, Apr. 10, 1978.

[51] Int. Cl.³ .......... G01D 15/18

[52] U.S. Cl. .......... 346/75; 346/1.1

[58] Field of Search .......... 346/1, 75

[56] References Cited

U.S. PATENT DOCUMENTS

| | | | |
|---|---|---|---|
| 3,877,036 | 4/1975 | Loeffler et al. | 346/75 |
| 3,916,421 | 10/1975 | Hertz | 346/75 |
| 4,027,309 | 5/1977 | Manning et al. | 346/75 X |
| 4,027,310 | 5/1977 | Baker et al. | 346/75 |
| 4,032,924 | 6/1977 | Takano et al. | 346/75 |
| 4,068,240 | 1/1978 | Fan et al. | 346/75 |
| 4,086,602 | 4/1978 | Yamada | 346/75 |
| 4,123,760 | 10/1978 | Hou | 346/75 |

OTHER PUBLICATIONS

Carnahan, Robt. D. et al., Ink Jet Technology, IEEE Transactions on Industry Applications, vol. IA-13, No. 1, Jan./Feb. 1977, pp. 95-105.

*Primary Examiner*—George H. Miller, Jr.
*Attorney, Agent, or Firm*—Michael H. Shanahan

[57] ABSTRACT

A novel, dynamically electrostatically scanning ink jet system is provided by applying a time varying potential to an electrode located adjacent the continuous stream portion of ink emitted by a jet at a location prior to break-up of the continuous stream portion into droplets.

24 Claims, 9 Drawing Figures

ELECTROSTATIC SCANNING INK JET SYSTEM

This is a continuation, of application Ser. No. 894,799, filed Apr. 10, 1978.

BACKGROUND OF THE INVENTION

This invention relates to ink jets; and, more particularly, to ink jet recording systems utilizing a continuous stream of ink emitted from an orifice prior to droplet production.

Speed and versatility provided by non-impact printing processes have led to the development of several types. One type is referred to as ink jet printing and several forms of ink jet printing are known. One such form produces drops of ink upon demand and operates such that an ink filled cavity is deformed to squirt ink from the cavity, through the orifice and upon a receiving medium. In another form of ink jet printing, a meniscus of ink is maintained at the orifice and is drawn therefrom by electrostatic charge attraction upon a receiving medium. In another form of ink jet printing, magnetic ink is operated upon with magnetic field forces in addition to electrostatic field forces to cause deflection of the ink selectively into desired positions upon the receiving medium.

In the form of ink jet printing to which the present invention relates, conductive fluid is delivered under pressure through a cavity from which it exits through an orifice in the form of a continuous stream. Perturbation is applied to the ink in the cavity, such as for example, by periodic excitation of piezoelectric crystals mounted within the cavity, causing the continuous stream to break up into substantially uniform drops which are substantially uniformly spaced from one another. The point at which the continuous streams break up into droplets is herein referred to as the point of drop formation. At the point of drop formation, drop charge electrodes having a potential applied thereto induces a charge upon the drops. Selective deflection of the drops is then achieved by passing the drops through an electric field created by deflection electrodes having a voltage impressed thereon. The electric field created by the deflection electrodes operates upon the charged drop so as to selectively deflect the charged drop to a predetermined position on the receiving medium or to a gutter.

In the continuous stream form of drop formation in ink jet printing, the number of elements involved in selective deflection by deflection plates to either a gutter or to one of several locations on a print plane creates design problems. The requirement that these elements be located adjacent the path of flight of the ink between the orifice and the receiving medium; the burden of data processing required to be handled by the electronics in cases where the selective deflection by the deflection plates can be to either the gutter or the receiving member, and if to the receiving member then to any of a predetermined number of positions upon the receiving member; and the space required to be occupied by the number of elements along the ink flow path, provides design constraints which can affect the quality of printing, system cost, ease of fabrication, and packing density of nozzles within the drop generator. For example, the greater the number of elements required along the ink flow path between the point of drop formation and the receiving medium, the greater the resulting distance between the drop generator nozzles and the receiving medium; and, the greater the distance, the more accurate the sustem alignment and deflection parameters must be in order to hit the "target" of selected drop placement at the print plane.

PRIOR ART STATEMENT

U.S. Pat. No. 3,877,036 to Loeffler et al is directed to the form of ink jet printing wherein a continuous stream of ink breaks up into droplets, is charged at the point of drop formation and is selectively deflected by an electrical field force to either a gutter or the printing medium, and if to the printing medium then to one of a predetermined number of positions on the printing medium. This patent is deemed relevant because it shows vernier jet alignment electrodes adjacent the continuous stream and at a location prior to the point of drop formation. However, the potential applied to the vernier jet electrodes is varied only to cause the continuous stream to be aligned properly with respect to the droplet charge electrodes; and, once proper alignment of the continuous stream is achieved, the voltage applied to the jet vernier electrodes is maintained constant. Thus, there is no scanning or sweeping back and forth of the solid continuous streams in this patent.

U.S. Pat. No. 1,941,001 to Hansell, and U.S. Pat. No. 3,689,936 to Dunlavey appear to be relevant to the extent that they disclose an electrode adjacent an apparently continuous stream of ink. While the Dunlavey patent utilizes an AC electrical field applied to two electrodes between which the continuous ink stream passes, the purpose and means utilized is such that the alternating field does not cause scanning of ink droplets subsequent to the point of drop formation but rather causes a vibration or oscillation of the continuous stream to facilitate drop formation. In the Hansell patent, electrostatic attraction between one or more electrodes and a solid continuous stream of ink is utilized to deflect the stream by electrostatic attraction exerted in accordance with the energy of a signal to be recorded. However, the continuous stream is not scanned in a raster mode but rather is deflected in accordance with the signal to be reproduced so as to constitute a reproduction of that signal; and, the data representing the signal to be reproduced is placed on the deflection electrodes.

SUMMARY OF THE INVENTION

It is an object of this invention to provide a novel ink jet printing system architecture.

It is another object of this invention to reduce the data applied to droplet charge electrodes to two-state data representing a decision to either deflect the droplet to a gutter or to allow it to proceed to the paper, with no additional information being required to be provided to the charge electrodes.

It is another object of this invention to eliminate the need for using deflection electrodes in order to direct charge droplets to any of a predetermined number of positions on a recording medium and thereby reduce the space occupied by such elements intermediate the point of drop formation and the receiving medium.

It is a further object of the present invention to eliminate the need for special gutter openings of limited size intermediate the point of drop formation and the receiving medium and to thereby eliminate the occupation of space by such elements intermediate the point of drop formation and the receiving medium.

It is yet a further object of the present invention to provide binary charging of droplets at the point of drop formation to thereby allow shortening of the ink flow path between point of drop formation and the receiving medium which results in a lessening of the requirements for nozzle alignment.

Moreover, it is a further object of the present invention to separate the drop charge data from the raster scan data to allow use of simpler and less costly electronic control circuitry utilizing a reduced data rate.

Yet another object of the present invention is to substantially reduce aerodynamic problems typically associated with ink jet printing.

These and other objects of the present invention are achieved by providing a scan electrode for the continuous stream of ink prior to the point of ink drop formation, applying a scan signal to said scan electrode to cause said continuous stream to be directed towards a plurality of positions on said receiving member such that droplets produced at said point of drop formation are directed towards and impact selected ones of said plurality of positions depending solely upon whether said droplets are provided with a charge, and providing a charge electrode at said point of drop formation to selectively charge certain ones of said drops directed towards said receiving medium. A gutter is provided and either charged or uncharged drops are caused to land therein with the other of charged and uncharged drops impacting said receiving member.

These and other objects, features and aspects of the present invention will become clearer and more fully apparent from the following detailed description when read in conjunction with the accompanying drawings, wherein.

Figure 4:
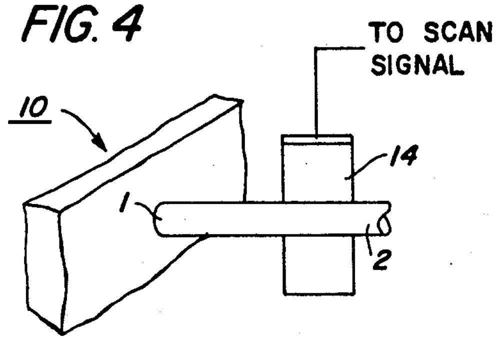

FIG. 4 schematically illustrates a suitable alternative scan electrode.

Figure 5:
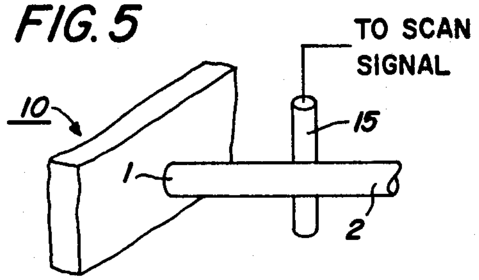

FIG. 5 schematically illustrates another suitable alternative scan electrode.

Figure 6:
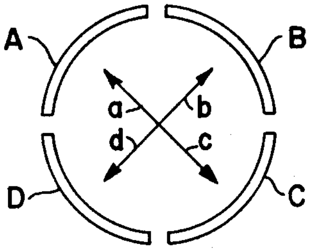

FIG. 6 schematically illustrates a scan electrode suitable for deskewing.

Figures 7A, 7B:
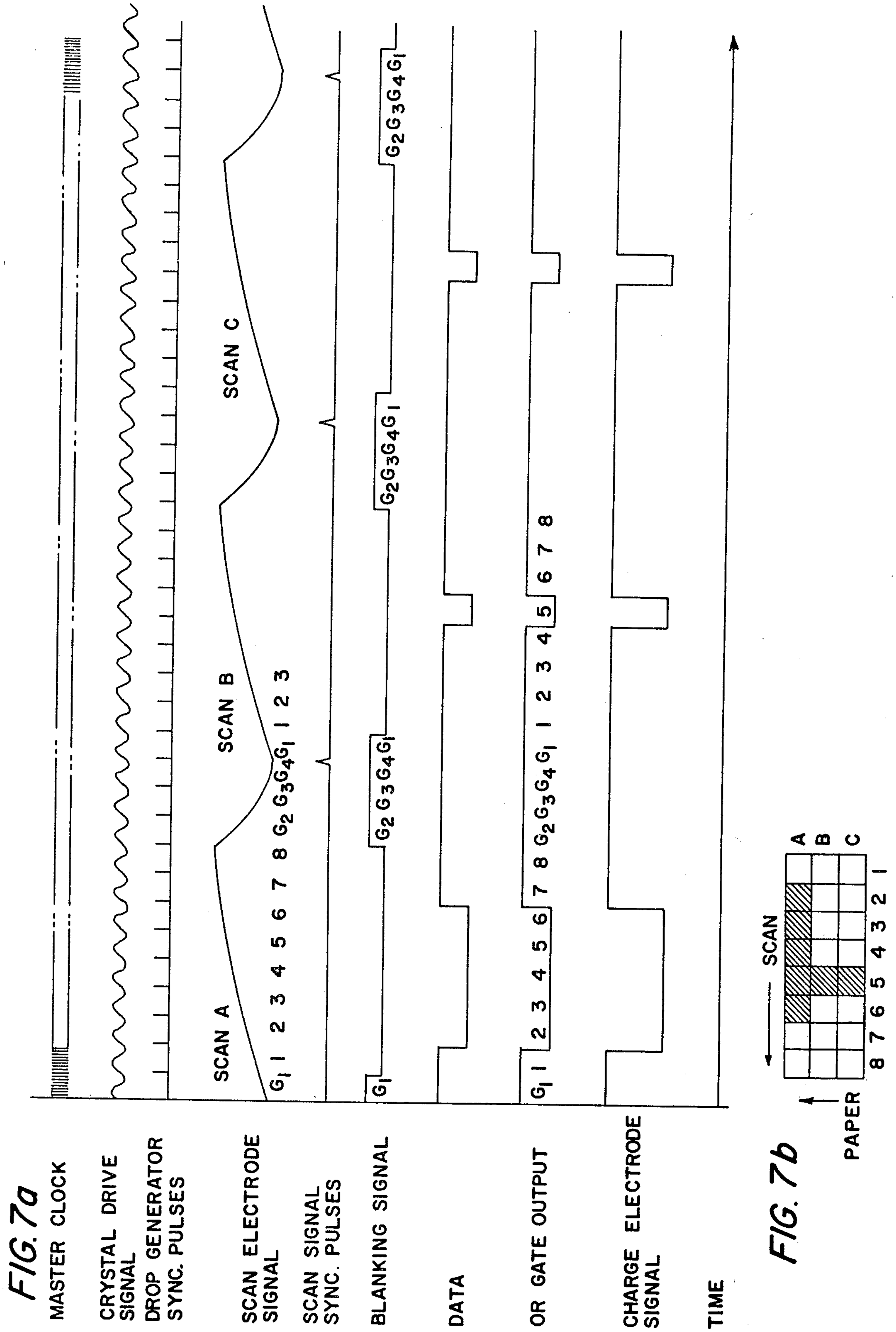

FIGS. 7A and 7B schematically illustrate the timing of signals suitable for use in the practice of the present invention.

Figure 8:
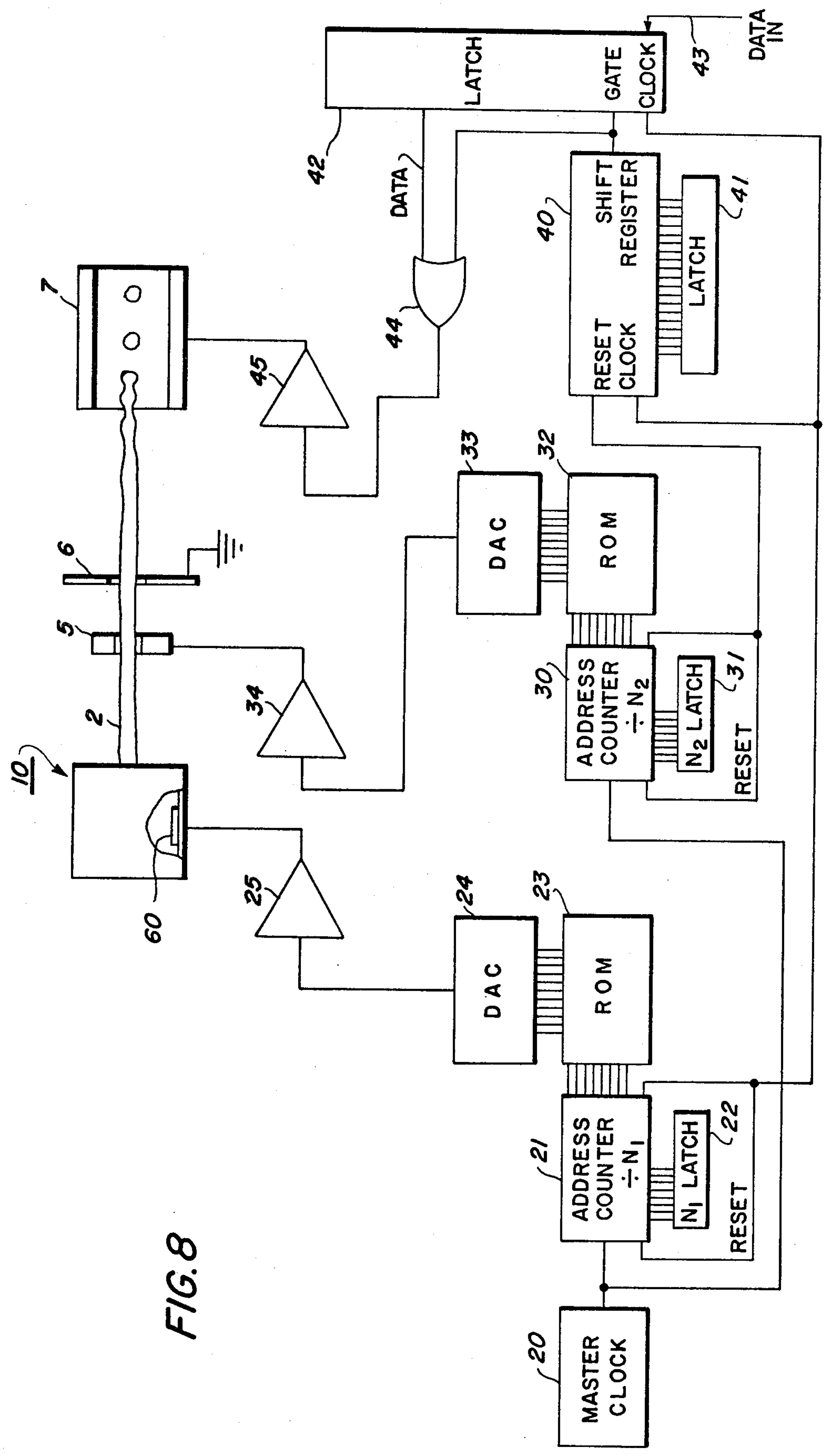

FIG. 8 schematically illustrates electronic circuitry suitable for use in the practice of the present invention.

DETAILED DESCRIPTION OF THE PREFERRED EMBODIMENTS

Figure 1:
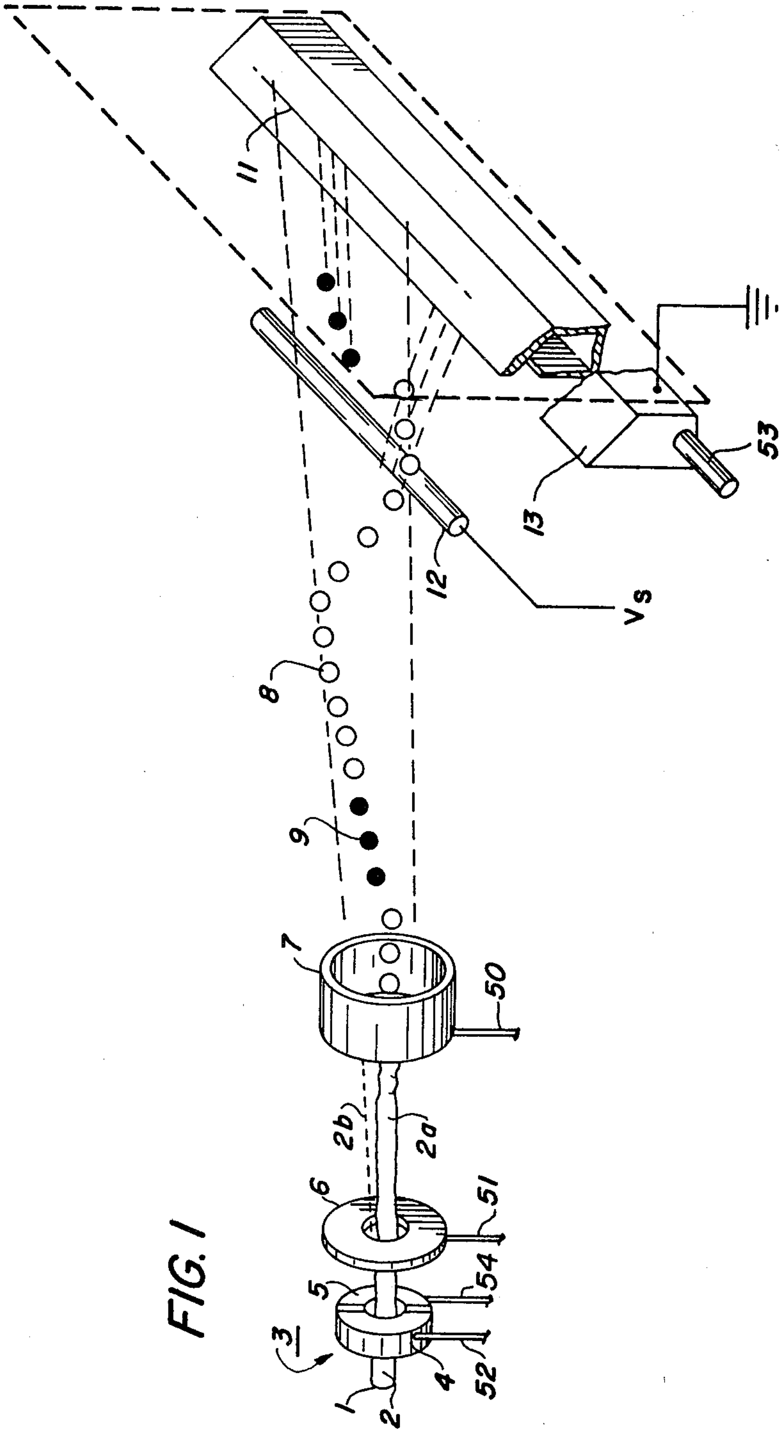
FIG. 1 is a schematic illustration of a single, scanning ink jet provided in accordance with the practice of the present invention.

Referring now to FIG. 1, there is shown a single, scanning ink jet provided by the practice of the present invention. The nozzle 1 of drop generator 10 (of FIG. 2) has emminating therefrom a continuous electrically grounded stream 2 of ink which passes through a split ring electrode 3 comprising electrode elements 4 and 5. A time varying voltage constituting the scan signal can be applied to either electrode 4 via lead 52 or electrode 5 via lead 54, or to each sequentially, or a different signal can be applied to each of electrodes 4 and 5 simultaneously, thereby inducing a charge upon continuous stream 2 of opposite polarity to the voltage appearing at split ring electrode 3. The attraction between the induced charge in continuous stream 2 and the voltage of opposite polarity at split ring electrode 3 causes the stream to be pulled toward either electrode 4 or electrode 5, depending upon the relative magnitudes of electrodes 4 and 5, thus causing the continuous stream 2 to be laterally displaced in a direction substantially perpendicular to the axis of continuous stream 2. Subsequent to passing through split ring electrode 3, continuous stream 2 of ink passes through an optional ground shield 6 which is electrically grounded. Ground shield 6 with grounded lead 51 is used when the length of charge electrode 7 is insufficient to shield uncharged drops from the scan electrode and is located intermediate split ring electrode 3 and drop charge electrode 7. When electrically grounded, ground shield 6 prevents the scan signal voltage from inducing charge upon drops 8. Drop charge electrode 7 having lead 50 is located at the point of drop formation which, as previously mentioned, is the break up point of continuous stream 2 when a periodic perturbation is applied to ink in a manifold or cavity in drop generator 10 which is in communication with nozzle 1.

Due to the scanning motion imparted to continuous stream 2 by split ring electrode 3, continuous stream 2 is caused to scan between positions 2A and 2B. As depicted in FIG. 1, and to be elaborated upon below, the scanning of continuous stream 2 between positions 2A and 2B results in a lateral distribution of drops intermediate the point of drop formation at drop charge electrode 7 and the printing plane 11. Drops shown as solid, drops 9, are uncharged while the other drops, drops 8, are charged.

Drop deflection electrode 12 is electrically connected to a suitable voltage source, $V_s$, and can be located either above or below the lateral distribution of drops 8 and 9. As depicted in FIG. 1, drop deflection electrode 12 is located beneath the lateral distribution of drops 8 and 9 and, since the drop deflection electrode can act only on charged drops 9, the polarity of voltage source $V_S$ must be of opposite polarity to the charge on charged drop 9 thereby attracting charged drop 9 into a downward trajectory resulting in charged drop 9 landing in gutter 11. It will be appreciated that drop deflection electrode 12 can be located above the lateral distribution of drops 8 and 9 and, in that case, the polarity of voltage source $V_S$ is of the same polarity as that of charged drops 9 in order to allow repulsion therebetween to achieve the downward deflection of charged drop 9 into a trajectory resulting in charged drops 9 landing in gutter 11. Furthermore, it will be appreciated that gutter 11 can be located either above or below the lateral distribution of drops 8 and 9. Accordingly, the voltage polarity of voltage source $V_S$ applied to drop deflection electrode 12 must be chosen with the location of drop deflection electrode 12 and gutter 11 kept in mind. As depicted in FIG. 1, the uncharged drops 8 are allowed to strike the paper while the charged drops 9 are deflected into the gutter. While this is preferred in order to minimize ink splatter contamination normally associated with charged drops being printed upon the paper, it will be appreciated that if desired the relationship between gutter 13 (preferably with vacuum applied at port 53), drop deflection electrode 12 and print plane 11 can be arranged so that uncharged drops normally impact into gutter 13 and charged drops 9 are deflected into impact with print plane 11 of a receiving medium.

With regard to the time varying scan signal voltage applied to split ring electrode 3, it should be noted that the shape of the signal is chosen to provide the lateral distribution of drops 8 and 9 desired by the ink jet system designer. In a raster scanning mode, wherein an even distribution of drops impacting the receiving medium in the print plane 11 is desired, a ramp voltage which attains a maximum level as a function of the square root of time and then drops back to its initial level is generally sufficient. The ramp voltage will be discussed in more detail in relation to FIG. 7, below. In the event aberrations in lateral distribution occur due to fabrication or system designed deficiencies, the appropriate portion of the scan signal voltage wave shape can be altered to correct for lateral drop distribution irregularities. As depicted in FIG. 1, the shape of the scan signal voltage wave form is chosen to provide a substantially even distribution of drops 8 and 9, the scan flyback of continuous stream 2 is shown to take three drop periods, and all of the flyback drops are guttered into gutter 13. In the scan of drops (lateral distribution of drops between one set of maximum and minimum deflection points) just reaching the paper, the first three drops were guttered and have already disappeared from view. The next three drops are still on a trajectory to the paper. The last three drops are seen to be deflecting downward on their way to the gutter.

As previously mentioned, the scan signal voltage can be applied to either electrode 4 or electrode 5, or to both electrodes 4 and 5 to provide a net attraction between continuous stream 2 and split ring electrode 3. When the scan signal signal voltage is applied to electrode 4, continuous stream 2 is pulled from its normal axis towards electrode 4; when the scan signal voltage is applied to electrode 5, continuous stream 2 is pulled away from its normal axis towards electrode 5; when the scan signal voltage is applied alternatingly to both electrode 4 and electrode 5, continuous stream 2 is pulled away from its normal axis toward electrode 4 for a maximum distance determined by the maximum voltage level on the scan signal, passing back through its normal axis position toward electrode 5 when the scan signal is applied to electrode 5 and continues oscillating between the maximum points of deflection between electrodes 4 and 5 during application of the scan signal voltage in alternation between electrodes 4 and 5. If a first scan signal voltage is applied to electrode 4 and simultaneously a second scan signal voltage is applied to electrode 5, continuous stream 2 is attracted to the electrode having the greatest voltage level applied thereto in an amount determined in part by the difference between the voltage levels and determined in part by the amount of charge induced in continuous stream 2.

It will be appreciated that the geometry of drop charge electrode 7, ground shield 6 and split ring electrode 3 need not be limited to a circular geometry but may be provided in any shape suitable with system parameters. For example, the deflection of continuous stream 2 may be employed to such an extent that the openings in those elements are more suitably formed in the shape of ovals or even slots. Furthermore, with an array of scanning jets similar to that depicted in FIG. 1 (such arrays being shown in FIGS. 2 and 3) it is desirable to form the scan electrodes, ground shields and charge electrodes in as compact a configuration as is consistent with the jet placement density within the array.

Furthermore, it will be appreciated that the scan electrode need not be utilized in the form of a split ring, nor need there be an electrode on each side of the continuous stream 2. That is, only one electrode to one side of continuous stream 2 can be employed satisfactorily and provide raster scanning laterally to one side of the normal axis of continuous stream 2. This is schematically illustrated in FIGS. 4 and 5 where a single electrode is used to one side of continuous stream 2. In FIG. 4, scan electrode 14 is planar in shape and can be made from shimstock, for example. In FIG. 5, scan electrode 15 is cylindrical in shape and can comprise, for example, a rod or wire.

Figure 2:
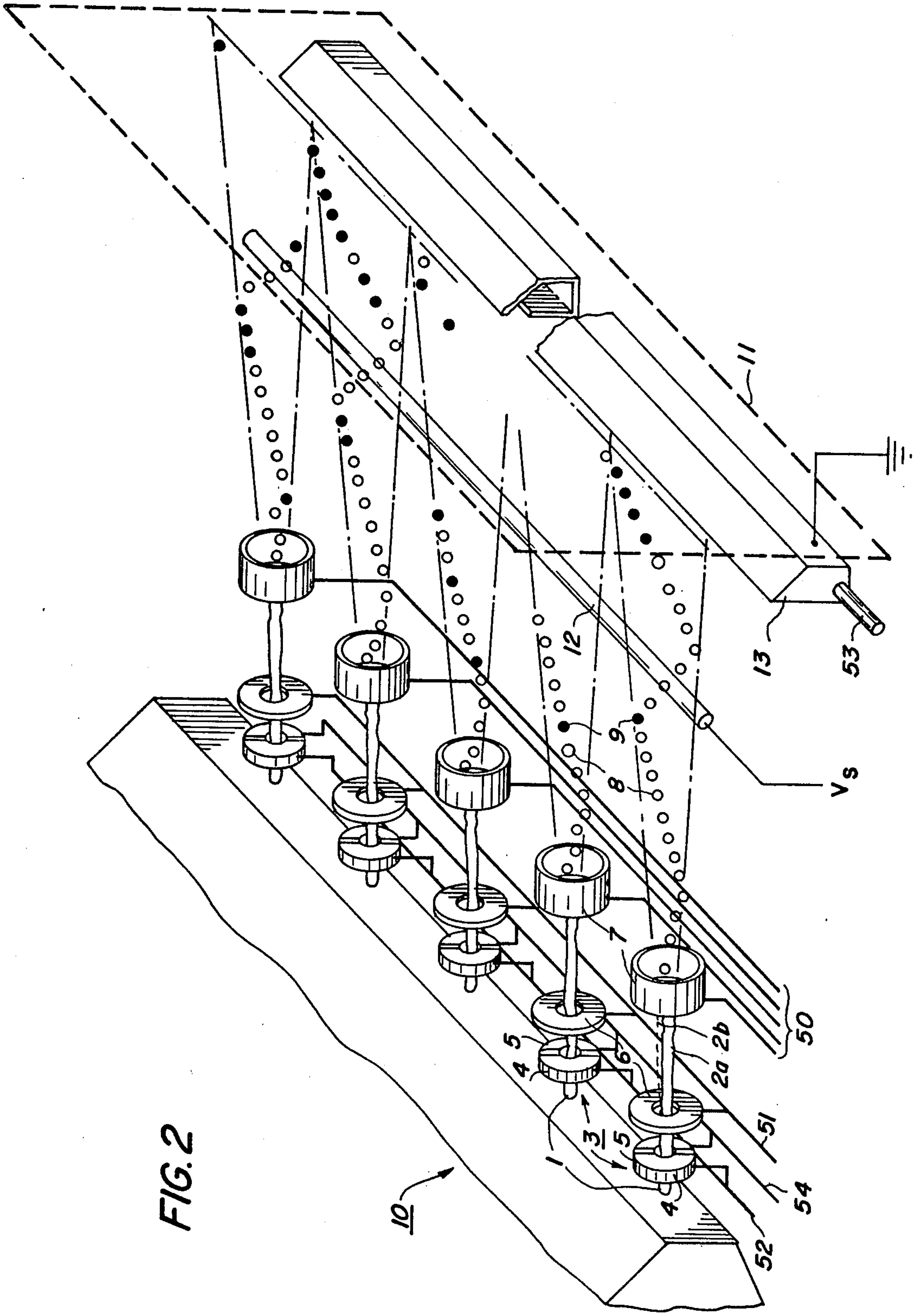
FIG. 2 is a schematic illustration of an array of a plurality of ink jets such as the ink jet shown in FIG. 1.
Figure 3:
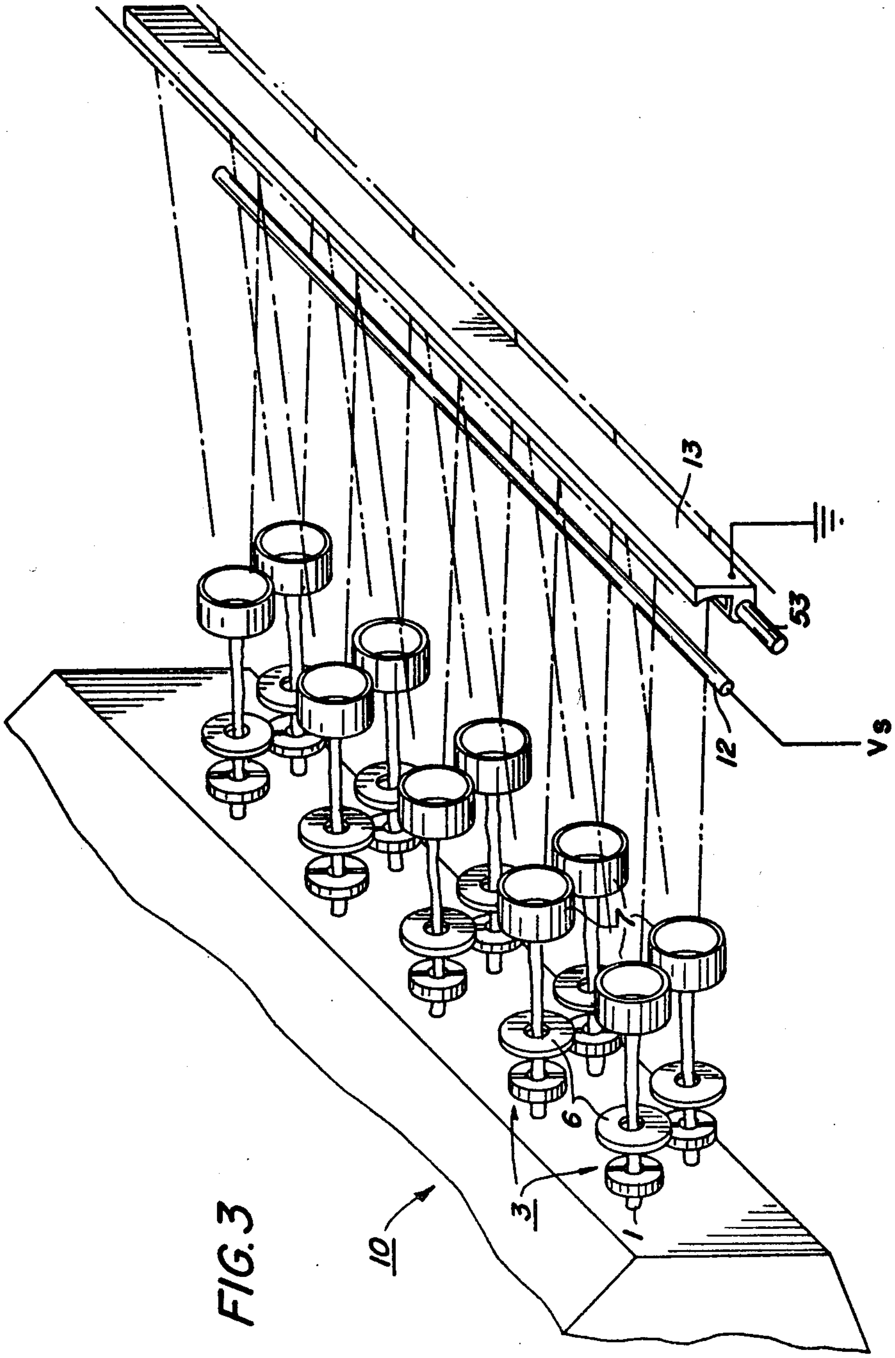
FIG. 3 is a schematic illustration of a two dimensional array of a plurality of ink jets such as that depicted in FIG. 1.

Referring now to FIG. 2, there is seen an array comprising a single row of jets similar to that depicted in FIG. 1 having the same elements as that depicted in FIG. 1. Like numerals in FIGS. 1 and 2 refer to like elements. Each jet is assigned a portion of the raster at print plane 11. It will be appreciated that the assigned portion at print plane 11 for each jet can be such that the assigned portions are contiguous at print plane 11 or can be such that the assigned portions are separated from one another by any desired amount. A two dimensional array of jets similar to that depicted in FIG. 1 is schematically illustrated in FIG. 3. In the embodiment of FIG. 3, the second row of jets is staggered or interdigitated with respect to the first row of jets. Such interdigitation could be employed to achieve several results; inter alia (1) to decrease the density in each row to provide more space between jets; (2) to reduce the number of drop placement positions in the print plane covered by each jet to make aerodynamic interactions less important a consideration; and (3) to create a highly interlaced image scan thereby giving more freedom to stitch interjet boundaries. Furthermore, it will be appreciated that a drop deflection electrode and gutter can be employed for each row of arrays or, as is preferred for design simplicity, a single deflection electrode and single gutter is used for every two rows of jets. The deflection electrode is biased to deflect charged drops from both rows.

It has been found that the amount of deflection of continuous stream 2 varies as the square of the applied voltage. That is, if the scan signal voltage is doubled, the deflection of continuous stream 2 is quadrupled. It has also been found that at a scan signal frequency of about 32 KHz electrohydrodynamic break up of the continuous stream 2 occurs causing drop formation frequency to be an undesirable combination of scan frequency and desired drop formation frequency. Accordingly, the scan signal frequency is to be kept at a frequency of about 32 KHz or less.

Various combinations of parameters may be chosen to practice the present invention. A combination of parameters illustrative as being suitable for use in the practice of the present invention is as follows: a drop generator perturbation of about 120 KHz; a scan signal ramping to a voltage of about 400 volts and then dropping to about 0 volts; a spacing of about 3 mils between continuous stream 2 and the scan electrode; a scan electrode parameter 10 mils along the stream; a charging voltage level of about 20 volts on charge electrode 7; and, a voltage level of about 3000 volts on drop deflection electrode 12.

The motion of the receiving member along the print plane can be either continuous or discontinuous. Discontinuous motion can be provided by a stepping motor so that the paper remains stationary during one scan period and is moved during flyback of the continuous stream. With proper alignment of the jets, skewing of lines printed on the stepped receiving medium does not occur. However, with continuous motion of the receiving medium in the print plane, skewing will occur in the printed line due to the different times of impact of drops generated during a scan period. One method for compensating for this is by skewing the array of jets and the drop generator in a direction opposite to the direction of skew in the printed line. Another method of offsetting the printed line skew is to use a multi-segmented electrode having two or more segments, as the scan electrode. Such an electrode, having four segments, is depicted in FIG. 6 as viewed from the front. The scan electrode in FIG. 6 is similar to that of FIG. 1 with the exception of having four segments rather than two segments. The four segments are depicted as segments A, B, C and D. Each segment, when biased, will attract the continuous stream towards itself along directions "a", "b", "c", and "d", respectively depending upon which segment is activated. Direction a corresponds to segment A, and so forth. The heavy dot in the center of the four directions denotes the continuous stream in its non-scanned or home position. The direction of deflection of the continuous stream is dependent upon the identity of the electrode segment addressed and the magnitudes of the voltage levels applied to the addressed segments. By providing continuous DC bias to selected electrode segments, the continuous stream can be maintained away from its home axis in a direction effective to offset printed line skew. Each jet in an array of jets can be similarly cocked to a selective home position from which scanning is caused by application of a time varying or periodic scan signal to selected scan electrode segments.

Referring now to FIGS. 7 and 8, there is schematically illustrated a timing diagram for the embodiment depicted in FIG. 1 wherein a single electrode 5 is used as the scan electrode. In this case, position 2A of continuous stream 2 represents the zero or "no scan signal" position of continuous stream 2 and position 2B thereof represents the maximum deflection of continuous stream 2 in the direction of electrode 5.

The following discussion will proceed generally, from top to bottom of FIG. 7A and from left to right of FIG. 8. A master clock for clocking the system is selected at a sufficiently high frequency, $f_m$ to provide the desired degree of accuracy to the system and to provide the desired ink throughput. This will be appreciated from an understanding of the following discussion. The waveform from the master clock 20 is used to clock address counter 21 and address counter 30. Data latches 22 and 31 are connected respectively to address counters 21 and 30. Address counters 21 and 30 are connected respectively to wave form read only memories 23 and 32 which provide respectively the crystal drive signal and scan electrode signal in digital form. The digital form of the signals are transformed by digital to analog converters 24 and 33 into analog signals. These analog crystal drive and scan signals are amplified respectively by amplifiers 25 and 34.

The frequency of the crystal drive signal, $f_d$, is equal to the master clock frequency, $f_m$ divided by the value of $N_1$. As an illustrative example, $f_m$ is given the value of 9.216 KHz and $N_1$ is given the value of 128 so that the crystal drive signal has a frequency, $f_d$, of 72 KHz. The frequency of the scan electrode signal, $f_s$ is equal to the frequency of the master clock divided by $N_2$ where $N_2$ is equal to $N_1$ times the number of drops desired from a single jet during one complete cycle of the scan electrode signal wave form, including flyback time. As depicted in FIG. 1, during one cycle of the scan electrode signal, including flyback time, a total of 12 drops is produced; 9 drops during active scanning of the continuous stream and 3 drops during flyback of the continuous stream to its home position. Thus, in this illustrative example, $N_2$ is equal to 12 times $N_1$ or is equal to 1,536. This provides a scan electrode signal frequency, $f_s$ of about 6 KHz.

The internal reset signal generated by address counter 21 is used to clock shift register 40 and the internal reset signal generated by address counter 30 is used to reset shift register 40, yielding one reset pulse per cycle of the scan electrode signal. This reset pulse is referred to in FIG. 7A as the scan signal synch pulse.

Shift register 40 is connected to data latch 41 which provides a blanking signal pattern for each scan of the continuous stream. In the context of the previous description of FIG. 1, a blanking signal is one which causes drops to be charged and consequently guttered. For example, it is desired not to impact the paper during flyback of the continuous stream to its home position and consequently the blanking signal is applied during the flyback of the continuous stream. It may also be desirable to cause blanking or guttering of drops during the active scanning of the continuous stream for purposes such as, for example, half-toning. Furthermore, a different blanking signal pattern may be desired for text. Consequently, data latch 41 can represent either firmware or software.

The function of the blanking signal pattern is to act as a synchronization signal for the scan signal and crystal drive signal (the frequency of the crystal drive signal is equal to the frequency of drop generation.) The blanking signal pattern in data latch 41 is parallel loaded in the shift register 40 upon receipt of a scan signal synch pulse at the reset of shift register 40. Subsequently, upon receipt of an internally generated reset pulse from address counter 21 at the clock input to shift register 40, the blanking signal is outputted from register 40 in serial format. The serial format of the blanking signal pattern is sent to one input of OR gate 44 and to the gate input of data latch 42. Data 43 corresponding to portions of text or graphics desired to be printed by the nozzle of interest during its scan is inputted into the gate of data latch 42. Data latch 42 is clocked by the internally generated reset signal produced by address counter 21. Thus, data is serially shifted out of data latch 42 at the same frequency as the frequency of drop formation.

In the context of the FIG. 1 description, uncharged drops are allowed to impact the receiving member at the printing point; accordingly, data is at a logical "zero" level for drops desired to be printed and at a logical "1" level when it is desired for drops to be guttered. The data signal appears at the other input to OR gate 44 and this gate produces an output when either the data or the blanking signal is at a logic level of "1". The output of gate 44 is amplified by amplifier 45 to an appropriate level (about 20 volts for the present illustrative example).

Three complete scans are depicted in FIG. 7: scan A, B and C. Twelve drops are produced during each scan and are illustratively depicted by the letters $G_1$ through $G_4$ and by the numerals 1 through 8. The first of the twelve drops, $G_1$, can be used as a guard drop to lessen the aerodynamic drag on the succeeding drops; drops 1 through 8 can be used for printing, if desired, and the last three drops $G_2$ through $G_4$ are guttered during flyback of the continuous stream. It will be appreciated that any number of drops can be generated during a scan period by adjustment of the parameters; that the number of drops available for printing is chosen as 8 in this example for facile system employment of popularly available eight bit per byte microprocessors; and, that more complex minicomputers and computers can be employed to allow for the printing of a multitude of drops per scan.

The blanking signal pattern depicted in FIG. 7A corresponds to the aforementioned desire to not print the first and last three drops of the twelve drops generated during a signal scan period. Accordingly, the blanking signal will cause gate 44 to go to a logical high state which results in charging the drop being formed at the point of drop formation. This drop, consequently, will be deflected by drop deflection electrode 12 of FIG. 1 into gutter 13. During each and every scan, this will occur for the four drops $G_1$ through $G_4$. The data signal for scan A is low only for drops 2 through 6 and consequently, only drops 2 through 6 can be printed on the receiving member, in the absence of a blanking signal. Since the output of gate 44 is low only in the absence of both a data signal logic high and a blanking signal logic high, drop charge electrode 7 is unbiased during scan A only during the formation of drops 2 through 6. Similarly, during scans B and C, only drops 5 can be printed. The three scan periods depicted in the FIG. 7A timing diagram will result in the print pattern depicted in FIG. 7B.

The circuity depicted in FIG. 8 can be used for a plurality of jets such as, for example, those depicted in FIGS. 2 and 3. The only addition required with a plurality of jets is that there be a separate data path for each drop charge electrode electrode 7: the data path consisting of a data latch 42, gate 44 and amplifier 45. Otherwise, the circuitry depicted in FIG. 8 can remain identical to the case where the circuitry controls only a single jet.

While the invention has been described by particular reference to preferred embodiments thereof, it will be appreciated by one skilled in the art that other variations and changes can be readily made in view of the previous discussion. The advantages provided by the invention are many. The system lends itself to binary drop charging which eases the problem of cost and speed of data channel electronics. The voltage required to be placed on drop charge electrode 7 is of relatively low magnitude, easing the problem of printed drop placement accuracy caused by electrostatic interactions due to highly charged drops and reduces the problem of ink mist and spatter of charged drops.

The present invention allows the use of a shorter throw distance from nozzle to print plane, for example, about 0.5 inches is a typical suitable throw distance for the present invention, which eases the problem of placement accuracy due to nozzle firing errors. The shorter throw distance, in turn, allows for a relatively small excursion off-axis which eases the problem of placement accuracy due to aerodynamic interaction. The present invention allows the use of common downstream parts which eases the problem of fabrication complexity and deflection plate and gutter fouling.

In the simultaneous scan of a plurality of jets, the present invention enables the reduction of jet density to within a very practical range of about 40 to about 120 jets per inch while yielding picture element (pixel) densities of about 300 to about 500 pixels per inch. Deflection is binary, paper path straight through and compact, and fabrication and interconnect problems are greatly reduced. Aerodynamic drop displacement effects are markedly reduced while relatively simple drive electronics can be employed.

Furthermore, it will be appreciated that electrostatic deflection means, shown in the Figures as drop deflection electrode 12, need not be limited to the form of a biased electrode. Rather, any means which will electrostatically attract or repel charged drops can be employed to deflect charged drops to either a collection means or the print plane. For example, electrostatic deflection means can comprise an electrostatically charged member charged with a polarity of charges appropriate to the desired deflection activity, or an element which is capable of having charge induced therein by the proximity of a charged drop which causes an electrostatic interaction between that member and the charged drop. By use of the term "electrostatic deflection means" is meant any and all such suitable means. Furthermore, the use of the phrase "periodic" or the phrase "periodically" is used herein, with respect to inducing charge upon the continuous stream and with respect to periodic deflection of the continuous stream, to mean the quality, state, or fact of being regularly recurrent; i.e., having periodicity.

It will be appreciated that the present invention is ideally suited for raster output scanning and can be used as a single module printer having any of several inputs such as, for example, magnetically recorded tapes, cartridges, casettes, or disks; computer output; facsimile transmission, and so forth, with appropriate interfaces. The present invention can also be employed in a single unit having a raster input scanner for the convenient reproduction of original documents.

What is claimed is:

1. A fluid drop scanning recording system, comprising drop generation means including means for ejecting conductive fluid from a nozzle in a continuous stream toward a print plane and means for exciting the fluid to break up the continuous stream into drops at a point of drop formation, charging electrode means positioned between the nozzle and the print plane in close proximity to the continuous stream at the point of drop formation for selectively charging the drops, scanning electrode means located between the nozzle and charging means for periodically, electrostatically deflecting the continuous stream prior to the point of drop formation to obtain a lateral distribution of the drops formed from the stream, drop collection means located between the charging means and print plane and electrostatic deflection means for deflecting charged drops to either the collection means or the print plane.

2. The recording system according to claim 1 further including shielding electrode means located between the scanning and charging electrode means but not in contact with the stream for electrically shielding the conductive fluid at the point of drop formation from voltages applied to the scan electrode to obtain the periodic deflection of the stream.

3. The recording system according to claim 1 wherein the charging electrode means is coupled to means for charging those drops selected to be charged to substantially the same level.

4. The recording system of claim 1 wherein charged drops are deflected into the collection means.

5. The recording system of claim 1 wherein the charged drops are deflected into the print plane.

6. The recording system of claim 1 wherein the scanning electrode means comprises a single electrode located to one side of the continuous stream.

7. The system of claim 1 wherein the deflection means includes a single deflection electrode coupled to a non-ground voltage source.

8. The system of claim 1 wherein the deflection means includes a single deflection electrode capable of having charge induced therein by the proximity of a charged drop with the resultant electrostatic interaction deflecting the drop toward the single electrode.

9. The recording system according to claim 1 wherein the scanning electrode means comprises two electrodes, one on each side of the continuous stream.

10. The recording system of claim 9 wherein said two electrodes are biased with a scan signal voltage alternatingly.

11. The recording system of claim 9 wherein said two electrodes are biased substantially simultaneously with a scan signal voltage.

12. A fluid drop scanning recording system, comprising drop generation means including a plurality of nozzles for ejecting conductive fluid in a plurality of continuous streams toward a print plane and means for exciting the fluid to break up each of the continuous streams into drops at a point of drop formation, a plurality of charging electrode means positioned between the nozzles and the print plane, one charging electrode means being in close proximity to each of the continuous streams at the point of drop formation for selectively charging the drops, a plurality of scanning electrode means located between the nozzles and charging electrode means for periodically, electrostatically deflecting the continuous streams prior to their points of drop formation to obtain a lateral distribution of the drops formed from the streams, drop collection means located between the charging electrode means and the print plane and electrostatic deflection means for deflecting charged drops to either the collection means or the print plane.

13. The recording system of claim 12 wherein the plurality of continuous streams are aligned in at least a single row.

14. The recording system of claim 12 wherein the plurality of continuous streams are aligned in at least two rows, one row being staggered with respect to the other row.

15. The recording system of claim 12 further including a plurality of drop collection means and drop deflection means, one combination of each located intermediate the planes of two adjacent rows of continuous streams.

16. The recording system of claim 12 further including skew electrode means located adjacent the continuous stream near the scanning electrode means for electrostatically biasing the stream away from a home axis for the stream to skew the lateral distribution of the drops.

17. The system of claim 16 wherein said scanning and skew electrode means include four segments of a conductive cylinder wherein certain of the segments effect the periodic deflection of the stream and certain of the segments effect a particular bias of the stream from its home axis.

18. A method of recording comprising generating a continuous stream of conductive fluid which breaks off into drops at a point of drop formation, periodically, electrostatically deflecting the continuous stream at a location prior to the point of drop formation to obtain a lateral distribution of the drops formed from the stream, selectively charging ones of the drops of conductive fluid at about the point of drop formation and deflecting the charged drops in a direction different from that in which the drops are laterally distributed.

19. A method according to claim 18 wherein the uncharged drops contact a recording medium and the charged drops are prevented from contacting the recording medium.

20. The method according to claim 18 wherein the charged drops are electrostatically deflected to a recording medium and the uncharged drops are prevented from contacting the recording medium.

21. The method according to claim 18 wherein the step of periodically electrostatically deflecting the continuous stream comprises subjecting the stream to the influence of a first electrode on one side of the stream and subjecting the stream to the influence of a second electrode located on the other side of the stream.

22. The method according to claim 18 further including a plurality of continuous streams, each of which streams is subjected to the process steps of periodically electrostatically deflecting, selectively charging and deflecting in a direction different from that of the lateral distribution of the drops.

23. The method according to claim 18 wherein the step of periodically electrostatically deflecting the continuous stream comprises subjecting the stream to the influence of an electrode located on only one side of the stream.

24. The method according to claim 23 wherein each of the drops selected to be charged is charged to substantially the same charge level.

* * * * *